US012681219B1

(12) United States Patent
Xi

(10) Patent No.: US 12,681,219 B1
(45) Date of Patent: Jul. 14, 2026

(54) DEVICE CAPABLE OF ACHIEVING DIFFERENT DIAPHRAGMS AND OPTICAL IMAGING MODULE

(71) Applicant: GUANGDONG YUPIN INDUSTRIAL CO., LTD., Guangdong (CN)

(72) Inventor: Longlong Xi, Guangdong (CN)

(73) Assignee: GUANGDONG YUPIN INDUSTRIAL CO., LTD., Dongguan (CN)

( * ) Notice: Subject to any disclaimer, the term of this patent is extended or adjusted under 35 U.S.C. 154(b) by 0 days.

(21) Appl. No.: 19/320,129

(22) Filed: Sep. 5, 2025

(30) Foreign Application Priority Data

Aug. 21, 2025 (CN) .......................... 202511177059.2

(51) Int. Cl.
*G02B 5/00* (2006.01)
*G02B 27/00* (2006.01)
*G03B 9/04* (2021.01)

(52) U.S. Cl.
CPC ......... *G02B 5/005* (2013.01); *G02B 27/0018* (2013.01); *G03B 9/04* (2013.01)

(58) Field of Classification Search
CPC ....... G02B 5/005; G02B 27/0018; G03B 9/04
USPC ......................................................... 359/739
See application file for complete search history.

(56) References Cited

U.S. PATENT DOCUMENTS

| | | | | |
|---|---|---|---|---|
| 6,011,616 | A | * | 1/2000 | Volcy ................... G02B 6/3807 |
| | | | | 356/73.1 |
| 8,142,085 | B2 | * | 3/2012 | Hasegawa ................ G03B 9/02 |
| | | | | 396/483 |
| 2003/0223128 | A1 | * | 12/2003 | Watanabe ................ G03B 9/02 |
| | | | | 359/738 |
| 2007/0076184 | A1 | * | 4/2007 | Kwan ................... G02B 13/143 |
| | | | | 355/53 |
| 2010/0149509 | A1 | * | 6/2010 | Shiraishi ............ G02B 17/0657 |
| | | | | 359/227 |
| 2021/0124142 | A1 | * | 4/2021 | Kato ................ B29D 11/00009 |
| 2024/0324421 | A1 | * | 9/2024 | Wang ................... H10K 59/871 |

* cited by examiner

*Primary Examiner* — Mohammed A Hasan
(74) *Attorney, Agent, or Firm* — HOWARD M COHN and Associates, LLC

(57) ABSTRACT

The present disclosure discloses a device capable of achieving different diaphragms and an optical imaging module. The device includes a light-shielding carrier strip and two winding and unwinding mechanisms, wherein the carrier strip is provided with a plurality of light-transmitting holes, and the two winding and unwinding mechanisms can drive the carrier strip to move, so that different light-transmitting holes can move to be directly in front of an imaging lens to form diaphragms of different sizes. The present disclosure does not require the use of blades, thereby eliminating the problem of affecting a diaphragm effect due to friction between the blades and ensuring prompt diaphragm response, and sizes of the light-transmitting holes are preset, thereby guaranteeing consistent light throughput.

14 Claims, 3 Drawing Sheets

DEVICE CAPABLE OF ACHIEVING DIFFERENT DIAPHRAGMS AND OPTICAL IMAGING MODULE

TECHNICAL FIELD

The present disclosure relates to the technical field of optical imaging, and more particularly relates to a device capable of achieving different diaphragms and an optical imaging module.

BACKGROUND ART

A diaphragm is an important component of an optical imaging module, the area of the diaphragm directly affects light intake of the imaging module, and the area of a variable diaphragm may be adjusted, thereby improving the imaging quality of the imaging module in different shooting environments, wherein the variable diaphragms on the market at present are generally provided with a plurality of blades, the principle thereof is that the blades are driven to be opened and closed synchronously by a mechanical driving mechanism to be combined into a polygonal light-transmitting hole, and diaphragms of different sizes are formed by changing the size of a central aperture, and the advantage thereof is a large adjustment range; however, such a variable diaphragm has the following disadvantages: in the process of opening and closing the blades, an actual performance effect of the diaphragm may be affected by the factors such as friction between the blades, a mechanical clearance, mechanical control accuracy and a response speed, and the movement of the blades is likely to cause inconsistent sizes of diaphragm holes, thereby resulting in inconsistent light throughput.

SUMMARY OF THE INVENTION

It is an object of the present disclosure to overcome the above defects in the prior art and provide a device capable of achieving different diaphragms and an optical imaging module, which may eliminate the problem of affecting a diaphragm effect due to friction between blades, ensure prompt diaphragm response, and avoid the problem of inconsistent light throughput due to inconsistent sizes of diaphragm holes caused by the movement of the blades.

In order to achieve the above object, in a first aspect of the present disclosure, a device capable of achieving different diaphragms is provided, including a carrier strip, a first winding and unwinding mechanism, and a second winding and unwinding mechanism, wherein one end of the carrier strip is wound on the first winding and unwinding mechanism, the other end of the carrier strip is wound on the second winding and unwinding mechanism, the carrier strip is made of a light-shielding base material, a plurality of light-transmitting holes of different sizes which are arranged in sequence along a length direction of the carrier strip penetrate through the carrier strip, and the first winding and unwinding mechanism and the second winding and unwinding mechanism can drive the carrier strip to move so as to switch different light-transmitting holes.

The inner hole sizes of the light-transmitting holes in the carrier strip increase or decrease gradually along the length direction of the carrier strip.

The light-transmitting holes in the carrier strip are provided as circular holes, square holes, polygonal holes or annular toothed holes.

The light-transmitting holes in the carrier strip are arranged in a centrally equidistant, edge-equidistant, or non-equidistant manner.

The inner hole sizes of the light-transmitting holes in the carrier strip are set to be 0.2 mm to 75 mm.

The light-transmitting holes in the carrier strip are made by means of punching or laser cutting.

The edges of the light-transmitting holes in the carrier strip are provided with beveled chamfers.

In a second aspect of the present disclosure, an optical imaging module is provided, including:

a device capable of achieving different diaphragms, including a carrier strip, a first winding and unwinding mechanism, and a second winding and unwinding mechanism, wherein one end of the carrier strip is wound on the first winding and unwinding mechanism, the other end of the carrier strip is wound on the second winding and unwinding mechanism, the carrier strip is made of a light-shielding base material, a plurality of light-transmitting holes of different sizes which are arranged in sequence along a length direction of the carrier strip penetrate through the carrier strip, and the first winding and unwinding mechanism and the second winding and unwinding mechanism can drive the carrier strip to move so as to switch different light-transmitting holes; and an imaging lens positioned on a rear side of the carrier strip, different light-transmitting holes in the carrier strip capable of being switched to be directly in front of the imaging lens one by one.

The inner hole sizes of the light-transmitting holes in the carrier strip increase or decrease gradually along the length direction of the carrier strip.

The light-transmitting holes in the carrier strip are provided as circular holes, square holes, polygonal holes or annular toothed holes.

The light-transmitting holes in the carrier strip are arranged in a centrally equidistant, edge-equidistant, or non-equidistant manner.

The inner hole sizes of the light-transmitting holes in the carrier strip are set to be 0.2 mm to 75 mm.

The light-transmitting holes in the carrier strip are made by means of punching or laser cutting.

The edges of the light-transmitting holes in the carrier strip are provided with beveled chamfers.

Compared with the prior art, the present disclosure has the following beneficial effects.

The present disclosure is simple in structure and reasonable in design. In the present disclosure, a light-shielding carrier strip, a first winding and unwinding mechanism, and a second winding and unwinding mechanism are provided, wherein a plurality of light-transmitting holes of different sizes which are arranged in sequence along a length direction of the carrier strip penetrate through the carrier strip, and the first winding and unwinding mechanism and the second winding and unwinding mechanism can drive the carrier strip to move, so that different light-transmitting holes can move to be directly in front of an imaging lens to form diaphragms of different sizes. The present disclosure does not require the use of blades, thereby eliminating the problem of affecting a diaphragm effect due to friction between the blades and ensuring prompt diaphragm response, and sizes of the light-transmitting holes are preset and cannot be changed after repeated use, thereby guaranteeing consistent light throughput and avoiding the problem of inconsistent light throughput due to inconsistent sizes of diaphragm holes caused by the movement of the blades.

An aperture size of a variable diaphragm in the present disclosure has higher accuracy, thereby reducing the instability of mechanical variations of conventional diaphragms.

The present disclosure may adapt to carrier strips of different thicknesses and materials, thereby having better compatibility.

DETAILED DESCRIPTION OF THE INVENTION

Example 1

Figure 1:
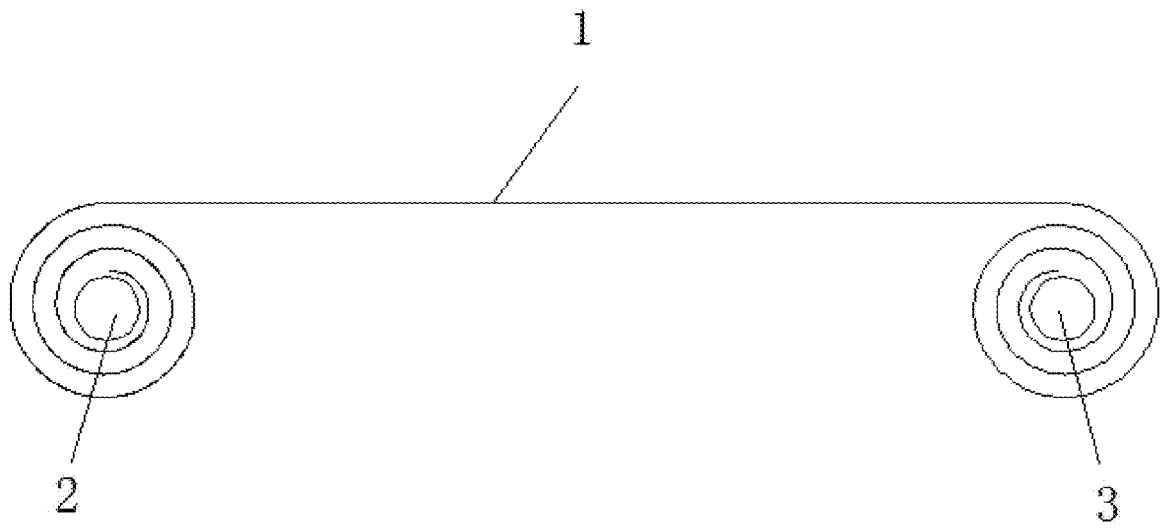
FIG. 1 is a schematic structural diagram of a device capable of achieving different diaphragms.

Referring to FIG. 1, an example 1 of the present disclosure provides a device capable of achieving different diaphragms, including a carrier strip 1, a first winding and unwinding mechanism 2, and a second winding and unwinding mechanism 3, wherein one end of the carrier strip 1 is wound on the first winding and unwinding mechanism 2, and the other end of the carrier strip 1 is wound on the second winding and unwinding mechanism 3. Various constituent parts of this example will be described in detail with reference to the accompanying drawings below.

In this example, the carrier strip 1 may be made of a light-shielding base material in the shape of a rectangular sheet. Preferably, the light-shielding base material may be preferably provided as a plastic material with both sides being black or a plastic material with both sides being provided with light-shielding coating layers. During selection of materials, the plastic material may be preferably provided as PI or PET, and of course, other light-shielding materials, for example, metal materials such as copper and stainless steel, or other non-metal materials, may also be used according to actual needs, which is not limited in this example as long as the materials are relatively thin and can achieve good light-shielding effects.

Figure 2:
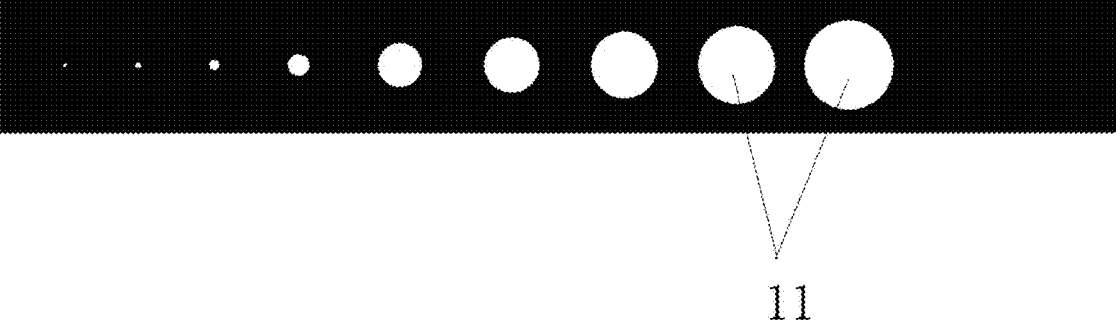
FIG. 2 is a schematic structural diagram of a first carrier strip.

As shown in FIG. 2, a plurality of light-transmitting holes 11 of different sizes which are arranged in sequence along a length direction of the carrier strip 1 penetrate through the carrier strip 1, and the light-transmitting holes 11 in the carrier strip 1 may be provided as circular holes. Of course, in other examples, according to actual needs, as shown in FIG. 4 to FIG. 7, the light-transmitting holes 11 may also be provided as square holes, polygonal holes (such as pentagonal holes and hexagonal holes), annular toothed holes or other special-shaped holes;

wherein inner hole sizes of the light-transmitting holes 11 in the carrier strip 1 may increase or decrease gradually along the length direction of the carrier strip 1. Of course, according to actual needs, the light-transmitting holes 11 in the carrier strip 1 may also not be arranged in the order of the inner hole sizes.

Preferably, the inner hole sizes of the light-transmitting holes 11 in the carrier strip 1 may be preferably set to be 0.2 mm to 75 mm. Of course, in other examples, other inner hole sizes may also be set, which may be specifically determined according to the diaphragm size and the number of stops required by a product lens.

Figure 3:
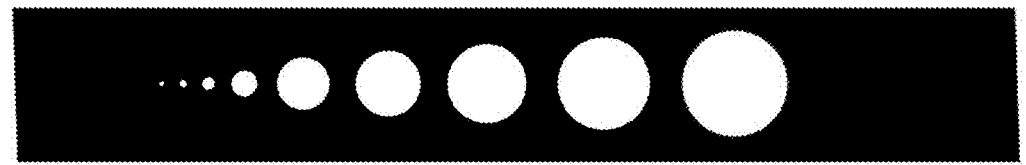
FIG. 3 is a schematic structural diagram of a second carrier strip.
Figure 4:
FIG. 4 is a shape diagram of a second light-transmitting hole.
Figure 5:
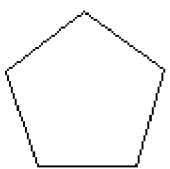
FIG. 5 is a shape diagram of a third light-transmitting hole.
Figure 6:
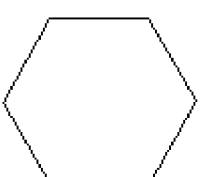
FIG. 6 is a shape diagram of a fourth light-transmitting hole.
Figure 7:
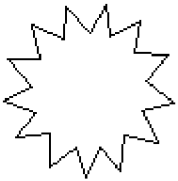
FIG. 7 is a shape diagram of a fifth light-transmitting hole.

As shown in FIG. 2, the light-transmitting holes 11 in the carrier strip 1 may be arranged in a centrally equidistant manner. In other examples, as shown in FIG. 3, the light-transmitting holes 11 may also be arranged in an edge-equidistant manner. Of course, according to actual needs, the light-transmitting holes 11 may also be arranged in a non-equidistant manner.

During specific manufacturing, the light-transmitting holes 11 in the carrier strip 1 may be made by means of punching or laser cutting.

Figure 8:
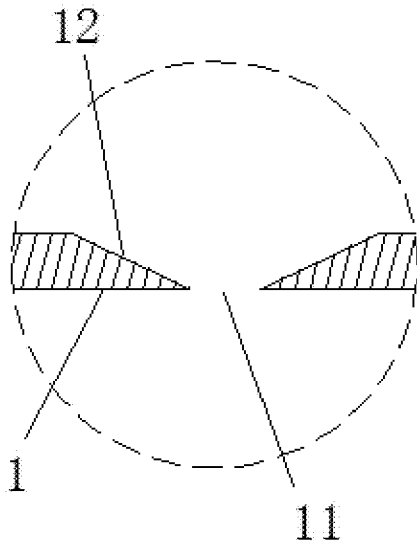
FIG. 8 is a partial cross-sectional diagram at the position of the light-transmitting hole of the carrier strip.

As a further improvement of this example, as shown in FIG. 8, edges of the light-transmitting holes 11 in the carrier strip 1 may also be provided with beveled chamfers 12, wherein the beveled chamfers 12 on inner sides of the light-transmitting holes 11 may decrease a vertical height of a side elevation, and reduce light reflected from a side wall, thereby effectively improving stray light.

In this example, preferably, both the first winding and unwinding mechanism 2 and the second winding and unwinding mechanism 3 may be provided as motors. Further, stepping motors, voice coil motors, servo motors, and the like may be selected, and rotating shafts of the motors may be connected to a tail end of the carrier strip 1. Of course, components such as reels for winding may also be additionally provided between the motors and the carrier strip.

During operation, the first winding and unwinding mechanism 2 and the second winding and unwinding mechanism 3 can drive the carrier strip 1 to move so as to switch different light-transmitting holes 11 to form diaphragms of different sizes.

Example 2

Figure 9:
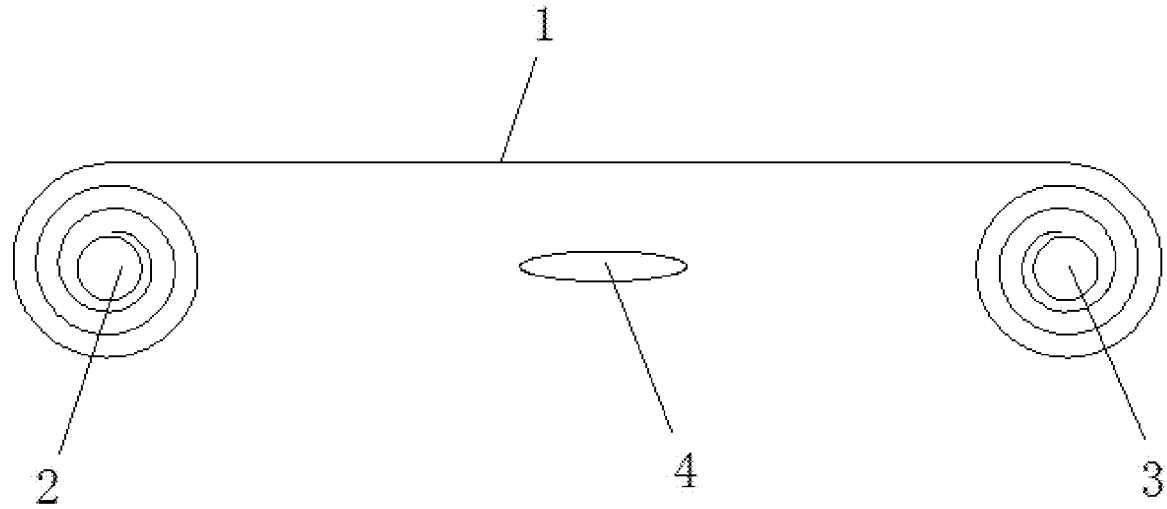
FIG. 9 is a schematic structural diagram of an optical imaging module.

Referring to FIG. 9, an example 2 of the present disclosure provides an optical imaging module, including an imaging lens 4 and the device capable of achieving different diaphragms described in the above example 1, wherein the imaging lens 4 is positioned on a rear side (namely, a light-emitting side) of the carrier strip 1.

During operation, according to the size of the diaphragm required by the imaging lens 4, the first winding and unwinding mechanism 2 and the second winding and unwinding mechanism 3 may be controlled to operate so as to drive the carrier strip 1 to move, so that the required light-transmitting hole 11 can be switched to be directly in front of the imaging lens 4 (namely, a light-entering position).

In summary, the present disclosure is simple in structure and reasonable in design. The present disclosure does not require the use of blades, thereby eliminating the problem of affecting a diaphragm effect due to friction between the blades and ensuring prompt diaphragm response, and sizes of the light-transmitting holes are preset and cannot be changed after repeated use, thereby guaranteeing consistent light throughput and avoiding the problem of inconsistent light throughput due to inconsistent sizes of diaphragm holes caused by the movement of the blades. In addition, an aperture size of a variable diaphragm in the present disclosure has higher accuracy, thereby reducing the instability of mechanical variations of conventional diaphragms, and the present disclosure may adapt to carrier strips of different thicknesses and materials, thereby having better compatibility.

The above examples are preferred embodiments of the present disclosure, but the embodiments of the present disclosure are not limited to the above examples. Any other changes, modifications, substitutions, combinations or simplifications made without departing from the spirit and principle of the present disclosure shall all be equivalent substitution modes and be included within the protection scope of the present disclosure.

The invention claimed is:

1. A device capable of achieving different diaphragms without diaphragm blades, comprising a carrier strip, a first winding and unwinding mechanism, and a second winding and unwinding mechanism, wherein one end of the carrier strip is wound on the first winding and unwinding mechanism, the other end of the carrier strip is wound on the second winding and unwinding mechanism, the carrier strip is made of a light-shielding base material, a plurality of light-transmitting holes of different sizes which are arranged in sequence along a length direction of the carrier strip penetrate through the carrier strip, and the first winding and unwinding mechanism and the second winding and unwinding mechanism can drive the carrier strip to move so as to switch different light-transmitting holes defined on the carrier strip, and both the first winding and unwinding mechanism and the second winding and unwinding mechanism are provided as motors, and rotating shafts of the first winding and unwinding mechanism and the second winding and unwinding mechanism are connected to a tail end of the carrier strip.

2. The device capable of achieving different diaphragms without diaphragm blades according to claim 1, wherein the inner hole sizes of the light-transmitting holes in the carrier strip increase or decrease gradually along the length direction of the carrier strip.

3. The device capable of achieving different diaphragms without diaphragm blades according to claim 1, wherein the light-transmitting holes in the carrier strip are provided as circular holes, square holes, polygonal holes or annular toothed holes.

4. The device capable of achieving different diaphragms without diaphragm blades according to claim 1, wherein the light-transmitting holes in the carrier strip are arranged in a centrally equidistant, edge-equidistant, or non-equidistant manner.

5. The device capable of achieving different diaphragms without diaphragm blades according to claim 1, wherein the inner hole sizes of the light-transmitting holes in the carrier strip are set to be 0.2 mm to 75 mm.

6. The device capable of achieving different diaphragms without diaphragm blades according to claim 1, wherein the light-transmitting holes in the carrier strip are made by means of punching or laser cutting.

7. The device capable of achieving different diaphragms without diaphragm blades according to claim 1, wherein the edges of the light-transmitting holes in the carrier strip are provided with beveled chamfers.

8. An optical imaging module without diaphragm blades, comprising:

a device capable of achieving different diaphragms, comprising a carrier strip, a first winding and unwinding mechanism, and a second winding and unwinding mechanism, wherein one end of the carrier strip is wound on the first winding and unwinding mechanism, the other end of the carrier strip is wound on the second winding and unwinding mechanism, the carrier strip is made of a light-shielding base material, a plurality of light-transmitting holes of different sizes which are arranged in sequence along a length direction of the carrier strip penetrate through the carrier strip, and the first winding and unwinding mechanism and the second winding and unwinding mechanism can drive the carrier strip to move so as to switch different light-transmitting holes defined on the carrier strip, both the first winding and unwinding mechanism and the second winding and unwinding mechanism are provided as motors, and rotating shafts of the first winding and unwinding mechanism and the second winding and unwinding mechanism are connected to a tail end of the carrier strip; and an imaging lens positioned on a rear side of the carrier strip, different light-transmitting holes in the carrier strip capable of being switched to be directly in front of the imaging lens one by one.

9. The optical imaging module without diaphragm blades according to claim 8, wherein the inner hole sizes of the light-transmitting holes in the carrier strip increase or decrease gradually along the length direction of the carrier strip.

10. The optical imaging module without diaphragm blades according to claim 8, wherein the light-transmitting holes in the carrier strip are provided as circular holes, square holes, polygonal holes or annular toothed holes.

11. The optical imaging module without diaphragm blades according to claim 8, wherein the light-transmitting holes in the carrier strip are arranged in a centrally equidistant, edge-equidistant, or non-equidistant manner.

12. The optical imaging module without diaphragm blades according to claim 8, wherein the inner hole sizes of the light-transmitting holes in the carrier strip are set to be 0.2 mm to 75 mm.

13. The optical imaging module without diaphragm blades according to claim 8, wherein the light-transmitting holes in the carrier strip are made by means of punching or laser cutting.

14. The optical imaging module without diaphragm blades according to claim 8, wherein the edges of the light-transmitting holes in the carrier strip are provided with beveled chamfers.

* * * * *